July 6, 1948.
A. G. GROSS
2,444,698
TWO-TEMPERATURE INTERMITTENTLY OPERATING REFRIGERATOR
Filed June 5, 1943
2 Sheets-Sheet 2
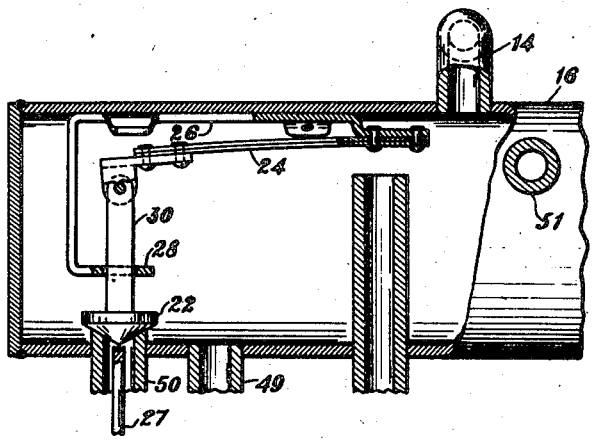
Fig. 2
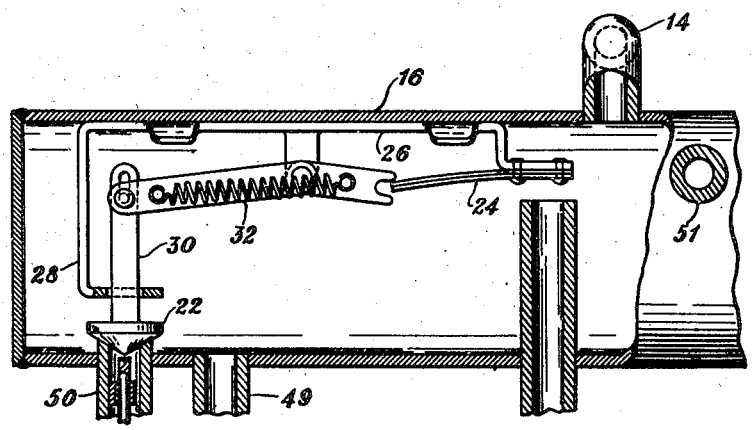
Fig. 3
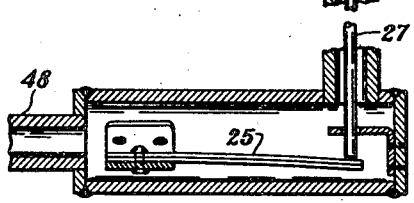
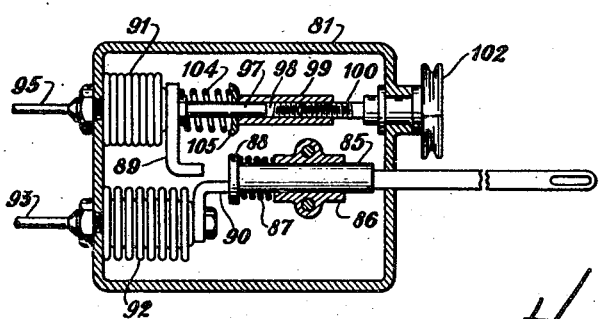
Fig. 4
INVENTOR.
Alfred G. Gross
BY
Harry S. Dumass Patented July 6, 1948

2,444,698

UNITED STATES PATENT OFFICE 2,444,698

TWO-TEMPERATURE INTERMITTENTLY OPERATING REFRIGERATOR

Alfred G. Gross, Wilmette, Ill., assignor to The Hoover Company, North Canton, Ohio, a corporation of Ohio Application June 5, 1943, Serial No. 489,727

12 Claims. (Cl. 62—5)

This invention relates to refrigeration and more particularly to a means and method for maintaining a temperature differential in two refrigerating zones while maintaining the same vapor pressure in each of the zones.

In modern domestic refrigerating apparatus in which the same evaporator is used for freezing purposes, for maintaining foods in frozen condition and also for maintaining the food storage compartment refrigerated, the air in the food storage compartment is dehydrated by deposition of the moisture from the air on the cold evaporator in the form of frost with the result that this dehydrated air picks up moisture from the food in the food storage compartment and dehydrates the same.

It is accordingly an object of this invention to provide a means and method by which a portion of the evaporator of a refrigerating apparatus can be maintained at a temperature sufficiently low for freezing purposes or for maintaining comestibles in frozen condition and another portion maintained at a mean temperature slightly above freezing so that the air and accordingly the food in the food storage compartment will not be dehydrated and will be maintained at the proper temperature and humidity.

More particularly, according to this invention, a dual intermittent absorption machine is provided comprising two intermittent units operating alternately on the absorption and generating periods to produce substantially continuous refrigeration in which the evaporator of each unit is provided with two coils, one for a high temperature chamber and the other for a low temperature chamber. The coils for the high temperature chamber are connected to receiver vessels in such a manner that the supply of liquid refrigerant to the high temperature coil is maintained for only a portion of the evaporating period of operation.

It is another object of this invention to provide a process and apparatus for maintaining a temperature differential in two zones in which liquid refrigerant is supplied to both zones for a period and evaporated at the same pressure and in which the supply of liquid refrigerant to the high temperature zone is discontinued while the vapor pressure in the two zones is equalized.

More particularly the conduits for leading liquid refrigerant to both the low and high temperature compartments are connected at each end to receiver vessels and so arranged that a local circulation of refrigerant is produced through each conduit by the evaporating refrigerant. When the temperature of the high temperature compartment reaches a predetermined proper low value the flow of refrigerant through its conduit is throttled or cut off completely so that no further evaporation of refrigerant takes place therein, while the flow of refrigerant continues through the conduit of the low temperature compartment.

In the first portion of the above stated operation, evaporation of refrigerant in both zones takes place at a comparatively high vapor pressure and the rate of circulation and evaporation of the refrigerant through the conduits of each zone is in direct proportion to the load on the respective zone, while in the second portion of operation evaporation of refrigerant takes place only in the conduits of the low temperature zone at a comparatively low vapor pressure although the conduits of each zone are in open communication with each other.

This has a distinct saving in that it is not necessary to pump heat at a low heat level from the high temperature compartment to the cooling air as has been the case in the past but when the heat level in the high temperature compartment has reached its proper level the transfer of heat from that zone to the cooling air ceases even though its conduit is in open communication with a region of lowering vapor pressure and consequently a lowering heat level.

The above arrangement also has the advantage that the transfer of heat from both the high and low temperature compartments will take place in proportion to the load on that compartment regardless of whether the heaviest load is placed on the low or high temperature compartment.

It has been been proposed to control the energy input to refrigerating apparatus of the type under consideration by the temperature of the low temperature compartment. This has the disadvantage that if there is no demand for refrigeration from the low temperature compartment and a sudden load is placed on the high temperature compartment, the high temperature compartment will not be further refrigeration until the low temperature compartment again calls for refrigeration.

According to another aspect of the present invention the high temperature compartment takes over the control of the energy input to the refrigerating apparatus when there is a refrigeration demand from the high temperature compartment and no refrigeration demand from the low temperature compartment.

Some of the foregoing objects of the present invention have been solved in a United States patent application by Otis B. Sutton, Serial No. 446,471, filed June 10, 1942, now Patent No. 2,436,945, dated March 2, 1948, and this application is an improvement over the foregoing application.

Other objects and advantages of this invention will become apparent when taken in connection with the accompanying drawings in which:

Figure 2 is a detailed view of the receiver vessel with the connecting conduits and a thermostatic throttling valve for controlling the flow of refrigerant to the conduct leading to the high temperature compartment;

Figure 3 is a modified form of a receiver vessel according to this invention, showing a snap acting valve for controlling the flow of refrigerant to the conduit of the high temperature compartment; and Figure 4 is a detailed view of the control for the energy input according to this invention.

Figure 1:
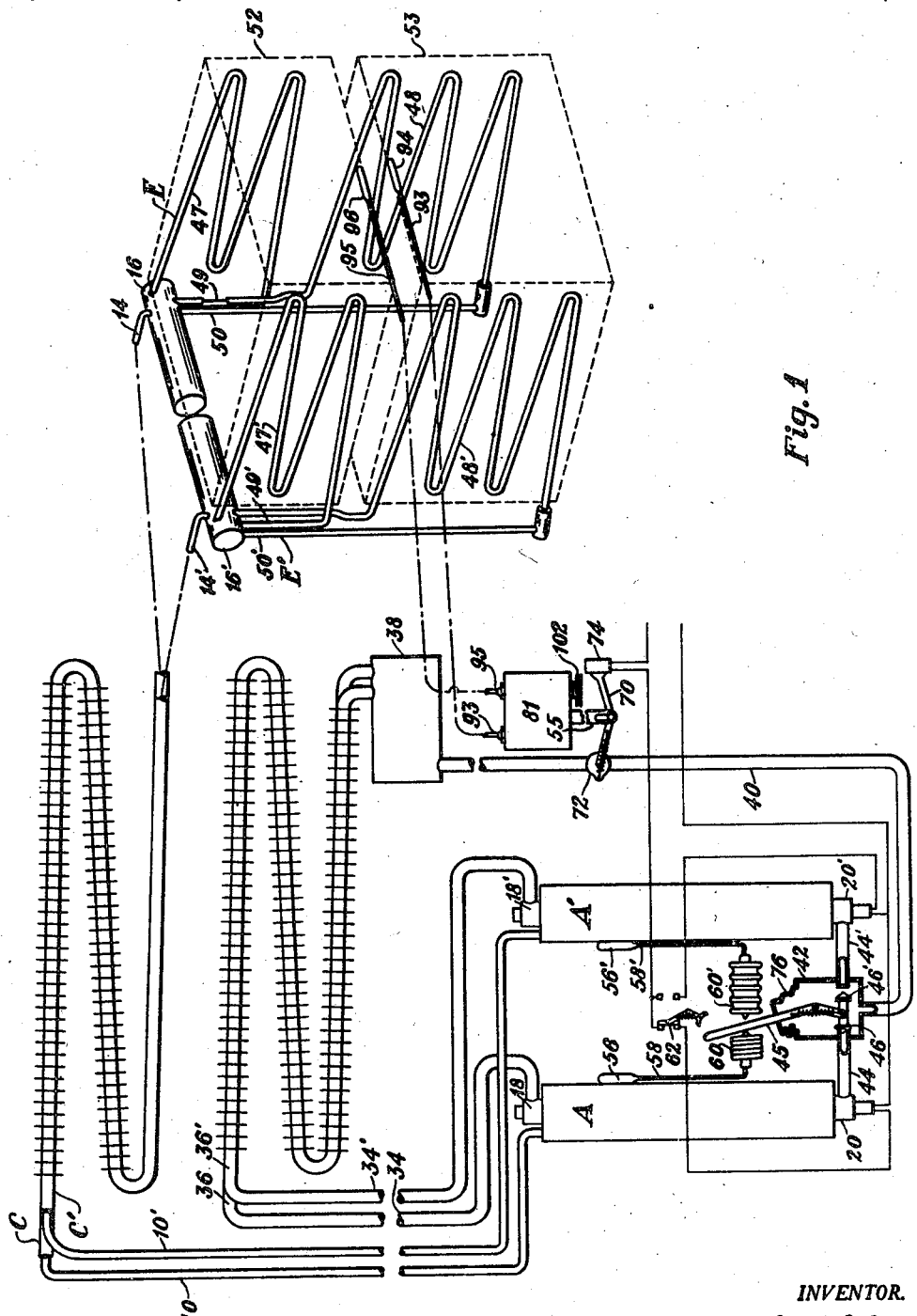
Figure 1 is a diagrammatic representation of a refrigerating apparatus according to this invention.

Referring to Figure 1 of the drawings, A, A' represents two generator-absorbers, C, C' two primary condensers, and E, E' two evaporators. The absorbent receiving chambers of the generator-absorbers A, A' are connected to condensers C, C' by conduits 10 and 10'. The condensers C, C' have a downwardly inclined slope throughout and are connected by conduits 14, 14' to receiving vessels 16, 16' which form a part of the evaporators E, E'. The construction and operation of the evaporators E, E' will be discussed in more detail hereinafter.

Each generator-absorber A, A' has an absorbent receiving chamber formed by the outer cylindrical walls of the vessels A, A', the outer cylindrical walls of the heat exchange vessels 18, 18' and end closures (not shown) welded to the cylindrical walls. The annular chambers so formed are provided with suitable trays (not shown) having openings through the walls thereof and being welded to the inner and outer cylindrical walls of the annular chambers. These trays support any well known solid absorbent such as strontium chloride which will absorb the refrigerant vapor such as ammonia, which solid absorbent may be charged into the absorption chamber in any manner well known to the art.

The heat exchange vessels 18, 18' are formed of inner and outer concentric cylindrical walls having end closures welded thereto and form annular receiving chambers for an indirect cooling fluid of the indirect cooling circuit for the generator-absorbers A, A', the construction and operation of which will be described in more detail hereinafter. In the cylindrical space formed by the inner cylindrical walls of the heat exchange vessels 18, 18' are electric heating cartridges 20, 20' of any construction known to the art.

The upper end of each of the annular heat exchange chambers 18, 18' of the generator-absorbers A, A' is connected by conduits 34, 34' to the secondary condensers 36, 36'. The secondary condensers 36, 36' have a continuous downward slope throughout and lead to a reservoir 38. The reservoir 38 is connected by conduit 40 to a valve chamber 42. The valve chamber 42 is connected by conduits 44, 44' to the lower ends of annular heat exchange vessels 18, 18' for the generator-absorbers A, A'. The valves 46, 46' are designed to be operated by a snap acting device 45 of any suitable construction.

Each of the evaporators E, E' consists of two coiled conduits 47, 47' and 48, 48' having legs 49, 49' and 50, 50' which extend vertically downwardly from the receiving vessels 16, 16'. In actual practice, the downwardly extending conduits 49, 49', 50, 50' and the vessels 16, 16' are imbedded in insulation for a purpose to be described more fully hereinafter. As shown in Figure 2, the downwardly extending legs 50, 50' extend upwardly into the interior of the vessels 16, 16' for a slight distance and the upper ends are bevelled to form valve seats while the downwardly extending legs 49, 49' lead into the vessels 16, 16' at the bottom thereof. The coiled conduits 47, 47' enter the vessels 16, 16' near the top as shown at 51 in Figure 2, while the coiled conduits 48, 48' extend upwardly into the vessels 16, 16' to adjacent the point of entrance of the coiled conduits 47, 47'.

As shown in Figure 2 the valve element 22 which cooperates with the upper beveled end of the conduits 50, 50' is mounted on the interior of the storage vessels 16, 16' through the intermediary of a bi-metallic thermostatic element 24 and a bracket 26 having a downward extension 28 which forms a guide for the valve stem 30. In Figure 3 the conduit 48 is shown as lying in the plane of the paper so as to show the thermostatic element 25 cooperating with a push rod 27 to raise the valve 22 under certain conditions as will be explained presently. The rod 27 may be provided with guides to keep it in central position. The operation of the valve will be described in more detail hereinafter.

As shown in Figure 1, the coiled conduits 47, 47' and 48, 48' are in thermal contact with walls forming chambers 52 and 53, respectively. Chambers 52 and 53 form the low and high temperature chambers, respectively, of a domestic refrigerator.

The thermostatic bulbs 56, 56' contact the outer surfaces of the generator-absorbers A, A' and are connected by capillary tubes 58, 58' to bellows 60, 60', which upon expansion and contraction are adapted to operate the snap acting device 45. The bulbs 56, 56', tubes 58, 58' and bellows 60, 60' contain a suitable vaporizable fluid so that the bellows 60, 60' will expand and contract upon variations in temperature of the bulb 56, 56' as is well known in the art. A snap acting switch 62 of any well known construction is positioned to be actuated by the snap acting device 45.

A thermostatic bulb 96 is positioned in contact with the low temperature chamber 52 and is responsive to the temperature of that chamber. The bulb 96 is connected by a capillary tube 95 to a bellows 91 having one end rigidly connected to a control housing 81 as shown in Figure 4. A second bulb 94 is positioned in contact with the chamber 53 and is responsive to the temperature of that chamber. The bulb 94 is connected by a conduit 93 to a bellows 92 having one end rigidly attached to the control housing 81 as shown in Figure 4. The bulbs 96 and 94, tubes 95 and 93 and bellows 91 and 92 contain a suitable vaporizable fluid so that the bellows 91 and 92 will expand and contract upon variations in temperature of the chambers 52 and 53 as is well known in the art.

Referring to Figure 4, the control housing 81 carries a plunger 85 which extends through one wall thereof and is mounted to slide on a suitable guide 86 supported by the wall of the casing 81. The plunger 85 is urged to the left by means of a spring 87 which reacts between the guide 86 and a flange 88 formed on the left hand end of the plunger 85.

The flange 88 is arranged to be contacted by a pair of contact fingers 89 and 90 which are carried on the free ends of the bellows 91 and 92, respectively.

The free end of the bellows 91 carries a projecting guide arm 97 which is slidably received in a smooth bore 98 of an adjusting nut 99. The element 99 may be secured against rotation by a projection on the housing 81, by making the plunger 97 and bore 98 non-circular or in any other desired manner. The end of the nut element 99 remote from the bellows 91 is internally threaded to threadably receive an adjusting screw 100 which projects through the wall of the chamber 81 and carries an adjusting knob 102.

A compression adjusting spring 104 surrounds the plunger 97 and bears at one end against the free end of the bellows 91 and at its opposite end against a suitable spring retaining cup 105 which bears against the adjusting nut 99. Consequently, rotation of the adjusting screw 100 will vary the compression of the spring 104 which will thereby vary the force against which the bellows 91 must expand to operate the plunger 85. Thus the temperature maintained in the chamber 52 will depend upon the compression of the spring 104 which will be determined by the adjustment setting of the knob 102.

The plunger 85 shown in Figure 4 is connected by a suitable lost motion connection to a snap acting device 70 which, upon reciprocation of the plunger 85, operates the valve 72 in the conduit 40 and an electric switch 74.

The indirect cooling circuit for the generator-absorbers A, A' which are formed by the heat exchange vessels 16, 16', conduits 34, 34', secondary condensers 36, 36', storage vessel 38, conduit 40, valve chamber 42 and conduits 44, 44', is suitably charged with a vaporizable liquid such as methyl chloride. The pressure within the indirect cooling circuit is not high so that the snap acting device 45 may be led into the interior of the valve chamber 42 through a suitable flexible joint 76.

As shown in Figure 1, the valve 72 is open and the switch 74 is closed. The switch 62 is set so that electricity will be conducted to the heating cartridge 20 of the generator-absorber A which will be heated. The bellows 60 is contracted and the bellows 60' is expanded by previous heating of the generator-absorber A' as will be described hereinafter. Thus the snap acting device 45 will be positioned to the left, the valve 46 will be closed and the valve 46' open.

With the control set as in Figure 1, the heating of the generator-absorber A will drive refrigerant vapor from the solid absorbent contained therein. The refrigerant vapor thus driven off will pass by the conduit 10 to the condenser C where it will be condensed and the heat of condensation carried away by air flowing over the heat rejecting fins mounted upon the tubes of the condenser. Condenser C has a continuous downward slope throughout and the condensed refrigerant will flow by gravity through conduit 14 into the receiving vessel 16 and the conduits 47, 48, 49 and 50.

As will appear hereinafter the valve 22 in the chamber 16 will be raised to its upward position by the thermostatic element 24 due to the fact that the temperature in the chamber 16 is high at this time.

During the heating of the generator-absorber A, the auxiliary cooling liquid in the annular heat exchange chamber 18 of the generator-absorber A will quickly vaporize, and flow by conduit 34 into the secondary condenser 36. The air flowing over the fins of the condenser 36 will carry away the heat of condensation of the auxiliary fluid whereby it will condense and flow downwardly through the tubes of the condenser 36 into the reservoir 38.

This liquid auxiliary cooling fluid cannot return to the generator-absorber A at this time because the valve 46 is closed.

In the meantime absorption of refrigerant vapor is taking place in the generator-absorber A' in a manner which will be described in connection with the absorption which takes place in the generator-absorber A when the control operates to shift the generator-absorber A from the generating period to the absorption period and the generator-absorber A' from the absorption period to the generating period.

When sufficient refrigerant has been driven from the absorbent in the generator-absorber A, the heat from the heating cartridge 20 will no longer be utilized in driving refrigerant vapor from the absorbent in the generator-absorber A and it will rise in temperature. This rise in temperature will be quite abrupt even though the heat supplied to the generator-absorber A remains constant. This comes about by reason of the fact that while refrigerant is being driven from solid absorbent, the heat supplied thereto is being utilized to vaporize the refrigerant and when the refrigerant is vaporized, the heat supply quickly raises the temperature of the generator-absorber to a much higher value. This will cause the liquid in the bulb 56 to vaporize whereby the bellows 60 will be expanded. At this time the bellows 60' will be in contracted position because absorption is taking place in the generator-absorber A' and the fluid in the bulb 56' will be condensed. Expansion of the bellows 60 will push the snap-acting device 45 to the right which will operate switch 62 to de-energize the heating element 20 and to energize the heating element 20'. At the same time it will operate to open the valve 46 and to close the valve 46'.

The indirect cooling system is charged with sufficient auxiliary cooling medium so that the reservoir 38 will always contain auxiliary cooling medium in liquid form. When the control operates to open the valve 46, liquid in the reservoir 38 will be dumped into the annular heat exchanger 18 of the generator-absorber A. Since the generator-absorber A is hot at this time, the auxiliary cooling liquid will be quickly vaporized by the transfer of heat of vaporization of the auxiliary liquid from the generator-absorber A and it in turn will thus be quickly cooled. The cooling of the generator-absorber A will reduce the vapor pressure therein and the solid absorbent therein will begin to absorb refrigerant vapor and vaporization of the liquid refrigerant in the evaporator E will begin.

It is evident that since the coils 47 and 48 are in open communication with the receiver 16, that the vapor pressure of the refrigerant in each coil will be the same. Since the downwardly extending conduits 49 and 50 are imbedded in insulation as previously described and the coil conduits 47 and 48 are in heat exchange relationship with the walls of the chambers 52 and 53, no refrigerant will be vaporized in the conduits 49 and 50 and considerable evaporation will take place in the coiled conduits 47 and 48 as the vapor pressure in the vessel 16 is reduced.

This will cause a rapid ebullition of refrigerant vapor in the upwardly extending coiled conduits 47 and 48 and consequently a positive circulation of liquid refrigerant will take place from the vessel 16, downwardly through the conduits 49 and 50 and upwardly through the coiled conduits 47 and 48 and back to the vessel 16. This circulation takes place by the lifting action of the refrigerant vapor evaporated in the coiled conduits 47 and 48 and is known in the art as a vapor lift pump action. Thus the more refrigerant vapor that is evaporated in the conduits 47 and 48, the more rapid will be the circulation. Furthermore, the greater the refrigerant load that is placed in the chambers 52 and 53, the greater will be the amount of heat which will be transferred to the liquid refrigerant in the coiled conduits 47 and 48. This will produce a greater or lesser evaporation of refrigerant in the conduits 47 and 48 depending upon the refrigeration load placed in the chambers 52 and 53. Thus it can be seen that the relative amount of refrigeration taking place in the coils 47 and 48 depends upon the relative load placed upon the chambers 52 and 53, respectively. During this period the temperature of the coils 47 and 48 will be substantially the same because the vapor pressure on their interior will be the same and each contains liquid refrigerant. Thus heat will be transferred from a relatively high temperature level to the ultimate cooling medium from both the chambers 52 and 53 during this period. However, the temperature of the chamber 53 can be maintained higher than that of the chamber 52 by altering the characteristics of the heat conducting path from the chamber walls to the coiled conduits.

The above described circulation of liquid refrigerant will continue in both conduits 47 and 48 until the temperature and consequently the vapor pressure in the vessel 16 falls below a predetermined limit. At this time the bimetallic thermostatic element 24 will begin to move the valve 22 in a downward direction so as to throttle the flow of liquid refrigerant entering the conduit 50 so as to reduce the rate of liquid circulation through the conduit 48 in heat exchange with the high temperature chamber 53 and consequently reduce the amount of heat transferred from that chamber to the evaporating refrigerant. When the temperature and consequently the vapor pressure in the vessel 16 has been lowered to a further predetermined lower limit, the bimetallic thermostatic element 24 will have completely closed the valve 22 and no liquid refrigerant will flow through the coiled conduit 48 at which time the vaporizing refrigerant will quickly empty the coiled conduit 48 and the conduit 50 of liquid refrigerant and no further heat will be transferred from the chamber 53 to the refrigerant. During the above action the temperature in the coil 48 has also lowered and the thermostatic element 25 has moved to its lowermost position so as to remove the pressure on the valve 22 exerted by the rod 27. Thus even though the coiled conduit 48 is in open communication with the vessel 16 heat is not transferred from the high temperature compartment at a low temperature level to the ultimate cooling medium but all of the heat required to be removed from the chamber 53 is transferred to the ultimate cooling medium at a comparatively high temperature level which greatly increases the over-all thermal efficiency of the apparatus. The circulation of refrigerant and the production of refrigeration in the conduit 47, however, will continue until the control 56' operates to switch the generator-absorber A back to the generating period as will be later described.

Since the production of refrigeration in the coil 48 has ceased, the temperature of the chamber 53 will slowly rise and any frost which may have frozen to the walls of the chamber 53 during the first part of the evaporating period will melt loose and the chamber 53 will be maintained in a moist cool condition.

As absorption proceeds in the generator-absorber A, the heat of absorption is transferred to the auxiliary cooling liquid in the annular heat exchange chamber 18. This vaporizes the auxiliary liquid and this vapor flows to the condenser 36 by conduit 34. Here the vapors condense and the heat of condensation is carried away by air flowing over the heat rejecting fins of the condenser 36. The tubes of the condenser 36 have a continuous downward slope and the liquid auxiliary cooling fluid returns to the reservoir to return in due course to the annular heat exchange chamber 18 for further cooling action.

As evaporation and absorption are taking place in the evaporator E and the generator-absorber A, the generator-absorber A' is being heated by the heating element 20'. Vapor is being driven from the solid absorbent in the generator-absorber A', condensed in the condenser C' and collected in the evaporator E', as previously described in connection with the ebullition of vapor from the generator-absorber A.

By the time that substantially all the liquid refrigerant in the evaporator E has evaporated, the refrigerant vapor will be driven from the solid absorbent in the generator-absorber A'. This will cause the medium in the bulb 56' to expand the bellows 60' in the manner previously described in connection with the generator-absorber A. The snap acting device 45 will be moved to the left, as viewed in Figure 1, whereby the valve 46 will be closed, the valve 46' opened, and the switch 62 operated to energize the heating cartridge 20 and to de-energize the heating cartridge 20'. This will cause vaporization to take place in the generator-absorber A and absorption in generator-absorber A', which will proceed as previously described.

The control bulbs 56 and 56' function to operate alternately the generator-absorbers A, A' on the generating period and on the absorption period, as just described, until the temperature of the chamber 52 goes below a predetermined limit which may be very substantially below the temperature in the chamber 53. If at that time the chamber 53 is also at its lowermost proper temperature the bulb 92 will be collapsed. The lowering of the temperature in the chamber 52 will cause condensation of the fluid in the bulb 96 and contraction of the bulb 91, which will allow the spring 87 to force the plunger 85 backwardly so that it will close the valve 72 and open the switch 74. This will operate to de-energize the generator-absorber which is then being energized and to stop the flow of cooling fluid in the indirect cooling circuit.

However, should a sudden load be placed in the high temperature compartment 53 or should that compartment not be at its desired low temperature, the bulb 92 will take over the control of the valve 72 and switch 74 and either operate the snap acting device 70 to open the valve 72 and to close the switch 74 or to hold the valve 72 in open position and the switch 74 in closed position so that the generator-absorber then on the generating period will be heated and the generator-absorber on the absorption period will receive cooling medium.

It may happen that toward the end of the cycling operation of the generator-absorbers A, A' and just before the control 81 operates to deenergize completely the units and stop the flow of the auxiliary cooling fluid, that the chamber 53 has already been cooled to its proper temperature, but the chamber 52 has not quite reached its proper low temperature when one of the units is switched to the generation period and the other to the absorption-evaporation period. The unit on the absorption-evaporation period will quickly cool the liquid refrigerant in the evaporator of that unit, the valve 22 will quickly close and the conduit 48 will be emptied. This quick cooling of the liquid will continue until the evaporation of refrigerant begins to take up heat from the chamber 52 which will continue until it reaches its proper low temperature at which time the bellows 91 will operate to de-energize both units and stop the flow of cooling medium to the unit operating on the absorption period. It will be noted, that under those conditions, very little refrigerant vapor will have been evaporated from the evaporator of the unit which was just operating on the absorption-evaporation period.

In order to make use of this unevaporated refrigerant and to provide for the prompt re-energization of the units in the event that a sudden load is placed in the chamber 53, the thermostatic element 26 and push rod 27 have been provided. Under the above circumstances, when a sudden load is placed in chamber 53 the conduit 48 which is in heat exchange therewith will immediately become warm. This will cause the end of the thermostatic element 26 to move upwardly and force the valve 22 from its seat through the intermediary of the push rod 27. The liquid refrigerant in the vessel 16 will be dumped into the coil 48 and evaporation and circulation of liquid refrigerant will take place in coil 48 as previously explained and quickly cool the chamber 53 to its proper temperature. At this time no evaporation will take place in coil 47 in heat exchange with the chamber 52 because the temperature of that chamber is below that of chamber 53. During this cooling of chamber 53 the units may or may not cycle. In any event the bellows 92 will eventually de-energize both units when the temperature of chamber 53 reaches its proper value.

When the control 81 operates to shut off the energy to the units and the flow of the auxiliary cooling medium, the liquid cooling medium in the annular heat exchange chamber of the generator-absorber which has been operating on the absorption period will soon vaporize due to the heat of absorption and will pass to the secondary condenser where it will be condensed. Since the tubes of the secondary condenser slope toward the reservoir 38, this condensed liquid cannot return to the cooling space of the generator-absorber being cooled, but will flow to the reservoir 38 to be trapped out of circuit by the closed valve 72. When the absorption of refrigerant vapor in the generator-absorber being cooled ceases, no more liquid refrigerant will evaporate in the evaporator of that unit. Thereafter the temperature of the air in the chamber 52 and also in the chamber 53 will slowly rise until the control 81 again operates to open the valve 72 and close the switch 74. The two units will then operate cyclically as previously described.

When one unit is operating on the generating period, the other is always operating on the evaporation and absorption period and substantially continuous refrigeration is being produced so that the chambers 52 and 53 are always maintained at the proper temperature.

In Figure 3, the bimetallic element 24 operates the valve 22 through the intermediary of a snap acting device 32 of any suitable construction. In this modification when a sufficiently low vapor pressure and consequently temperature has been reached in the vessel 16, bimetallic thermostatic element 24 and snap-acting device 32 will operate immediately to close the valve 22 and stop the flow of fluid into the downwardly extending conduit 60 and the coil 48. As can be seen in this modification there is no throttling action but the flow of liquid refrigerant is stopped immediately, but as before when the valve 22 is closed the liquid refrigerant in the coil 48 in heat exchange with the chamber 53 is quickly emptied and no further heat is transferred from the chamber 53 to the refrigerant even though the coil 48 is in open communication with the chamber 16. As before no heat is transferred from the chamber 53 to the ultimate cooling medium from a low temperature level but all of the heat required to be removed from that chamber is transferred from a comparatively high temperature level to the ultimate cooling medium. In this modification the thermostat 26 need only overcome the pressure of the spring of the snap acting device 32, when a sudden load is placed in the chamber 53 in order to open valve 22 and dump liquid refrigerant into coil 48.

From the foregoing it can be seen that this invention provides a method and apparatus by which a temperature differential can be maintained between high and low temperature chambers in which the evaporator coils of each are in open communication with each other and the vapor pressure in each is the same. The invention also provides means whereby heat transferred from the high and low temperature compartments to the refrigerant depends upon the load placed upon the respective chambers regardless of whether or not a large or small load is placed in either chamber.

The invention also provides a dual intermittent refrigerating machine having an indirect cooling circuit in which the heat input and the circulation of the auxiliary cooling fluid is normally controlled by the temperature of the low temperature compartment but in case the high temperature compartment has an unusually high load thrown thereon, the temperature of that compartment will take over the control of the supply of energy to the units and the circulation of the auxiliary cooling medium.

While I have shown but two embodiments of my invention it is to be understood that these embodiments are to be taken as illustrative only and not in a limiting sense. I do not wish to be limited to the specific structure shown and described, but to include all equivalent variations thereof except as limited by the scope of the claims.

I claim:

1. An absorption refrigerating apparatus comprising two intermittent absorption refrigerating units each having a generator-absorber and an evaporator, the evaporator of each unit comprising two coiled conduits in open communication with a common source of liquid refrigerant, one of said conduits being in heat exchange relation with a low temperature compartment and the other with a high temperature compartment and arranged for the circulation of liquid refrigerant through each conduit by the evaporation of the liquid refrigerant, and means for throttling the flow of liquid refrigerant through the conduit in heat exchange relation with the high temperature compartment as the temperature of that compartment approaches a predetermined minimum, said means also being constructed to stop completely such flow when the temperature of the high temperature compartment reaches said predetermined minimum.

2. An absorption refrigerating apparatus comprising two intermittent absorption refrigerating units each having a generator-absorber and an evaporator, the evaporator of each unit comprising two coiled conduits in open communication with a common source of liquid refrigerant, one of said conduits being in heat exchange relation with a low temperature compartment and the other with a high temperature compartment and arranged for the circulation of liquid refrigerant through each conduit by the evaporation of liquid refrigerant, means for throttling the flow of liquid refrigerant through the conduit in heat exchange relation with the high temperature compartment as the temperature of that compartment approaches a predetermined minimum, said means also being constructed to stop completely such flow when the temperature of the high temperature compartment reaches said predetermined minimum and control means for governing the supply of energy to both generator-absorbers normally responsive to the temperature of said low temperature compartment, said control means also being responsive to the temperature of said high temperature compartment to control the supply of energy to both generator-absorbers when the temperature of the high temperature compartment is above said predetermined minimum and the temperature of the low temperature compartment is below another predetermined minimum.

3. An absorption refrigerating apparatus comprising two intermittent absorption refrigerating units each having a generator-absorber and an evaporator, the evaporator of each unit comprising two coiled conduits in open communication with a common source of liquid refrigerant, one of said conduits being in heat exchange relation with a low temperature compartment and the other with a high temperature compartment and arranged for circulation of liquid refrigerant through each conduit by the evaporation of liquid refrigerant, means for throttling the flow of liquid refrigerant through the conduit in heat exchange relation with the high temperature compartment as the temperature of that compartment approaches a predetermined minimum, said means also being constructed to stop completely such flow when the temperature of the high temperature compartment reaches said predetermined minimum and control means for governing the supply of energy and the flow of cooling medium to both generator-absorbers normally responsive to the temperature of said low temperature compartment, said control means also being responsive to the temperature of said high temperature compartment to control the supply of energy and the flow of cooling medium to both generator-absorbers when the temperature of the high temperature compartment is above said predetermined minimum and the temperature of the low temperature compartment is below another predetermined minimum.

4. An absorption refrigerating apparatus comprising two intermittent absorption refrigerating units operating alternately on the generation and absorption phases each having a generator-absorber and an evaporator with a portion in heat exchange relation with a low temperature compartment and another portion in heat exchange relation with a high temperature compartment, an indirect cooling circuit for said units, means for supplying energy to each generator-absorber, control means for alternately switching the energy supply and the flow of cooling medium through said cooling circuit from one generator-absorber to the other in such a way that one generator-absorber is being heated while the other is being cooled and a second control means independent of said first control normally responsive to the temperature of said low temperature compartment for controlling the energy supply and the flow of cooling fluid to each generator-absorber and also being responsive to the temperature of said high temperature compartment and arranged so that the temperature of the high temperature compartment governs the supply of energy and the flow of cooling fluid to both generator-absorbers when the temperature of the low temperature compartment is below a predetermined minimum and the temperature of the high temperature compartment is above a predetermined minimum.

5. An absorption refrigerating apparatus comprising two intermittent absorption refrigerating units operating alternately on the generation and absorption phases and each having a part of its evaporator in heat exchange with a low temperature compartment and another part in heat exchange with a high temperature compartment, an indirect cooling circuit for said units and control means normally responsive to the temperature of the low temperature compartment for controlling the energy supplied to said units and the flow of fluids through said indirect cooling circuit, said control also being responsive to the temperature of said high temperature compartment and being so constructed as to take over the control of the energy supplied to said units and the flow of fluid through said indirect cooling circuit when said low temperature compartment is below a predetermined minimum and the temperature of said high temperature compartment is above a predetermined minimum.

6. An absorption refrigerating apparatus comprising two intermittent absorption refrigerating units operating alternately on the generation and absorption phases, each having an evaporator coil in heat exchange relation with a high temperature compartment and another coil in heat exchange relation with a low temperature compartment, control means for alternately changing each unit from the generation to the absorption phases and vice versa and a second control means independent of the first mentioned control means normally responsive to the temperature of the low temperature compartment for controlling the energy supplied to both units, said second control means also being responsive to the temperature of the high temperature compartment and operative to take over the control of the energy supplied to said units when the temperature of the low temperature compartment is below a predetermined minimum and the temperature of the high temperature compartment is above a predetermined minimum.

7. A two temperature refrigerating apparatus comprising two refrigerating machines operating alternately at high and low vapor pressures, each machine including a high temperature coil, a low temperature coil and means for supplying liquid refrigerant to each coil, means for controlling the supply of liquid refrigerant to the high temperature coil of the machine operating at low vapor pressure while continuing the unrestricted supply of liquid refrigerant to its low temperature coil and means for changing the operation of each machine from low pressure operation to high pressure operation and vice versa responsive to a temperature condition of the machine operating at high vapor pressures.

8. An evaporator for a refrigerating apparatus comprising, a receiver vessel and a pair of coiled conduits, each conduit extending downwardly from said vessel and having an outlet and an inlet to said vessel and a thermostatic valve operative to open and close the inlet to but one of said coils from said vessel.

9. An evaporator for a refrigerating apparatus comprising, a receiver vessel and a pair of evaporator conduits connected thereto, each of said conduits comprising an insulated downwardly extending portion and an upwardly extending coiled portion in heat exchange relation with a body to be refrigerated and arranged for the circulation of liquid refrigerant therethrough by vapor lift action and a thermostatic control valve for opening and closing the inlet to one of said coils from said vessel.

10. An evaporator for an intermittent absorption refrigerating apparatus comprising, a receiver vessel, a pair of looped conduits extending downwardly from said vessel, the inlet leg of each loop extending vertically downwardly from said vessel and the outlet leg of each loop comprising a serpentine coil in heat exchange with a body to be cooled whereby a positive circulation of liquid refrigerant is produced through each coil by vapor lift action when heat is supplied to the serpentine coil and a thermostatic throttling valve for the inlet leg of one of said loops.

11. An evaporator for an intermittent absorption refrigerating apparatus comprising, a receiver vessel, a pair of looped conduits extending downwardly from said vessel, the inlet leg of each loop extending vertically downwardly from said vessel and the outlet leg of each loop comprising a serpentine coil in heat exchange with the body to be cooled whereby a positive circulation of liquid refrigerant is produced through each coil by vapor lift action when heat is supplied to the serpentine coil and a thermostatic snap acting valve for the inlet leg of one of said loops.

12. An absorption refrigerating apparatus comprising two intermittent absorption refrigerating units each having a generator-absorber and an evaporator, the evaporator of each unit comprising two coiled conduits in open communication with a common source of liquid refrigerant, one of said conduits being in heat exchange with a low temperature compartment and the other in heat exchange with the high temperature compartment and arranged for the circulation of liquid refrigerant through each conduit by the evaporation of liquid refrigerant, valve means for throttling the flow of liquid refrigerant through the conduit in heat exchange with the high temperature compartment as the temperature of that compartment approaches a predetermined minimum and constructed to stop completely such flow when the temperature of the high temperature compartment reaches said predetermined minimum, control means for governing the supply of energy to both generator-absorbers normally responsive to the temperature of said low temperature compartment, said control means also being responsive to the temperature of said high temperature compartment to control the supply of energy to both generator-absorbers when the temperature of the high temperature compartment is above said predetermined minimum and the temperature of the low temperature compartment is below another predetermined minimum and means responsive to a temperature above said first predetermined minimum to cooperate with said valve to allow liquid refrigerant to flow into the coil in heat exchange with said high temperature compartment when its temperature exceeds the first predetermined minimum.

ALFRED G. GROSS.

REFERENCES CITED

The following references are of record in the file of this patent:

UNITED STATES PATENTS

| Number | Name | Date |
|---|---|---|
| 1,523,112 | Fitzgerald | Jan. 13, 1925 |
| 1,866,992 | Zeiber | July 12, 1932 |
| 1,955,087 | Philipp | Apr. 17, 1934 |
| 2,010,279 | Spohr | Aug. 6, 1935 |
| 2,030,676 | Atchison | Feb. 11, 1936 |
| 2,133,949 | Buchanan | Oct. 25, 1938 |
| 2,133,953 | Buchanan | Oct. 25, 1938 |
| 2,167,036 | Baker | July 25, 1938 |
| 2,436,945 | Sutton | Mar. 2, 1948 |